United States Patent [19]

Itakura et al.

[11] Patent Number: 5,052,904
[45] Date of Patent: Oct. 1, 1991

[54] AQUARIUM AIR PUMP

[75] Inventors: Tsuyoshi Itakura, Tokyo, Japan; Allan H. Willinger, Oakland, N.J.

[73] Assignees: Itakura Soki, Tokyo, Japan; Allan H. Willinger, Bros., Oakland, N.J.

[21] Appl. No.: 569,147

[22] Filed: Aug. 17, 1990

Related U.S. Application Data

[63] Continuation-in-part of Ser. No. 357,535, May 26, 1989, abandoned.

[51] Int. Cl.$^5$ .............................................. F04B 45/04
[52] U.S. Cl. .................................... 417/363; 417/413
[58] Field of Search ...................... 417/363, 412, 413

[56] References Cited

U.S. PATENT DOCUMENTS

| | | | |
|---|---|---|---|
| 3,289,917 | 12/1966 | Buchanan | 417/412 X |
| 3,671,151 | 6/1972 | Duke | 417/413 X |
| 4,154,559 | 5/1979 | Enomoto | 417/413 |
| 4,170,439 | 10/1979 | Hase | 417/413 |
| 4,610,608 | 9/1986 | Grant | 417/413 |

Primary Examiner—Robert G. Nilson
Attorney, Agent, or Firm—Helfgott & Karas

[57] ABSTRACT

An aquarium air pump includes an electromagnetic motor-operated pump unit positioned in the housing of the pump and including two vibrating arms energized by the motor and each carrying a pump diaphragm forming with a closure member of the pump unit casing a pump chamber. Each vibrating arm is positioned on the casing to be pivoted to an operative position to close the respective closure member and a non-operative position in which the arm can be removed from the casing and interchanged. The pump housing includes a bottom part and a top part connectable to each other and sealed in the connected position by a peripheral seal. Cushioning cups support the pump unit in the pump housing to absorb vibrations.

32 Claims, 5 Drawing Sheets

AQUARIUM AIR PUMP

CROSS REFERENCE TO RELATED APPLICATION

This application is a continuation-in-part of application Ser. No. 357,535 filed May 26, 1989, now abandoned.

BACKGROUND OF THE INVENTION

The present invention relates to fluid pumps in general, and more particularly to air pumps for use in the aeration and filtration of water in an aquarium.

Air pumps of the foregoing type normally comprise a driven pump element for drawing air through a pump inlet into an internal pumping chamber and for expelling air under pressure from the pumping chamber through a pump outlet. Aquarium pumps are used for pumping air at a relatively low pressure and flow rate into aquarium water to aerate the water to sustain aquatic life and to cause a flow of aquarium water through an aquarium filter for filtration of the contaminated aquarium water.

Since an aquarium is typically located in a home environment it is desirable that a pump for aquarium water aeration and filtration be designed for quiet and safe operation. Moreover, it is also desirable that such a pump be extremely waterproof due to its position near the aquarium tank, in order to prevent the pumping unit positioned inside the pump housing from being damaged by water which may be siphoned back from an aquarium tank through the air delivery line which extends from the pump to the tank.

Furthermore, it is also desirable to provide a pump with interchangeable structural components to make the pump easily and quickly repairable, even by the owner.

Electromagnetic air pumps in which flexible pumping diaphragms are reciprocated by an electromagnet motor have been known and disclosed, for example, in U.S. Pat. Nos. 4,154,559 and 4,170,439. The conventional air pumps of the foregoing type still produce a great deal of noise, and there has been need for the aquarium air pump in which pump vibrations are further absorbed.

SUMMARY OF THE INVENTION

It is accordingly an object of the present invention to provide an aquarium aeration pump which operates almost noiselessly.

It is another object of the present invention to provide an aquarium air pump with easily removable and interchangeable structural components, particularly pumping diaphragms which are subject to extensive wear and are often torn.

Briefly, in accordance with the invention, there is provided an air pump for aquarium aeration, comprising housing means including bottom housing means and top housing means, at least one electromagnetic pump unit supported in the bottom housing means and including a casing having a central member and provided with air inlet means and air outlet means. The pump unit includes two vibrators positioned at two sides of the central member, respectively. Each vibrator includes a diaphragm pump member. The central member includes at each side a valve closure member provided with valve means to communicate with an air suction chamber of the central member. The closure member at each side of the central member is closed at an external side thereof with a respective diaphragm pump member to form therewith a pump chamber at each respective side of the central member. Each vibrator includes a magnet. The air pump further comprises electromagnetic motor means to energize the magnets of the vibrators upon application to the motor means of a source of energy and thereby pulsate the diaphragm pump members to cause air sucked into the air suction chamber of the central member to be pumped through the pump chambers to the air discharge chamber of the central member. The vibrators include elongated arms pivotally supported on the casing and removably connectable thereto to enable interchanging of the arms. The pump further comprises air storing means defined in the casing and communicating with the air discharge chamber provided in the central member so that air pumped to the air discharge chamber by the diaphragm pump members flows to the air storing means. The air storing means is provided with the aforementioned outlet means to allow air to flow from the air storing means to the outlet means. The air storing means store some air to enable a more uniform air flow from the inlet means to the outlet means to thereby dampen pump vibrations.

In an embodiment of the invention, the pump unit casing is formed at a side thereof facing away from said motor means, with two holders receiving the vibrator arms.

In an embodiment of the invention, the vibrator arms are each provided with a pivot member received in a respective one of said holders.

In an embodiment, each holder includes a recess, each pivot member being fittingly received in said recess and being removable therefrom.

In an embodiment, each arm has an end portion inserted into said pivot member and being pivotable relative thereto between an operative position in which said diaphragm member encloses said closure member and a non-operative position in which said arm is pivoted away from said closure member, with such arms being interchangeable.

The pivot member may be formed of vibration-cushioning material.

The recess provided in each holder of the pump unit casing may be of substantially circular shape and have a narrower portion open outwardly to permit the removal of each arm.

In an embodiment of the invention, means are provided to support the pump unit in the housing means of the pump to substantially decrease vibrations of the pump unit during operation. The bottom housing means includes a plurality of mounting posts extending upwardly from a bottom wall of the bottom housing means. The pump unit support means includes a plurality of antivibration cushioning cups connected to the casing and mounted on the mounting posts to enable the pump unit to float in said housing means.

In an embodiment, the pump unit casing includes flange portions provided with holes, said cushioning cups each being inserted into one of said holes and including a cup-shaped portion situated on a respective mounting post and two flanges outwardly radially extending from the cup-shaped portion and each snugly abutting against opposing surfaces of a support platform portion of the casing.

In an embodiment, the top housing means includes a plurality of post-like members each provided with a recess which receives an elongated projection of the cushioning cup when the top housing means are connected to the bottom housing means.

In an embodiment of the invention, means for sealing the bottom housing means to the top housing means are provided when they are connected to each other. The sealing means include a peripheral seal extending along a periphery of each of the bottom housing means and the top housing means.

The peripheral seal may be a strip having two outer portions insertable into the bottom housing means and the top housing means, respectively, and a middle portion extending snugly along adjacent confronting edges of the bottom housing means and the top housing means when they are connected to each other.

In an embodiment, the air storing means is formed by an additional chamber formed in the pump unit casing and being in communication with the air discharge chamber of the central member, the air suction chamber of which receives air from atmosphere. The additional chamber is positioned below the central member to store air and enable a more uniform flow of pumped air towards the air outlet means.

In an embodiment, the bottom housing means includes an air inlet assembly through which air enters the housing of the pump from the atmosphere to flow to the air inlet means. The air inlet assembly includes a felt retainer having a hole, a felt washer in said retainer and a plurality of holes formed in a bottom wall of the bottom housing means to allow air flowing through the felt washer into the housing of the pump.

In an embodiment, at the inlet side of the pump chamber an acoustic absorber is mounted which includes a cup-shaped member with a very small opening at an underside thereof for admitting air into the acoustic absorber and a disc-shaped element inserted into the cup-shaped member and provided with a continual weaving passage connected to the above-mentioned small opening. An air outlet hole, which is connected to the passage and is also in communication with the inlet of the pump air chamber, is also formed in the disc-shaped member. Both, the cup-shaped member and the disc-shaped member are made of vibration-absorbing material, for example, rubber. Air passes through a long weaving passage before it enters the pump air chamber so that a substantial noise attenuation is obtained.

The aforementioned objects, features and advantages of the invention, will, in part, be pointed out with particularity, and will, in part, become obvious from the following more detailed description of the invention, taken in conjunction with the accompanying drawings, which form an integral part thereof.

DETAILED DESCRIPTION OF THE PREFERRED EMBODIMENTS

Figure 1:
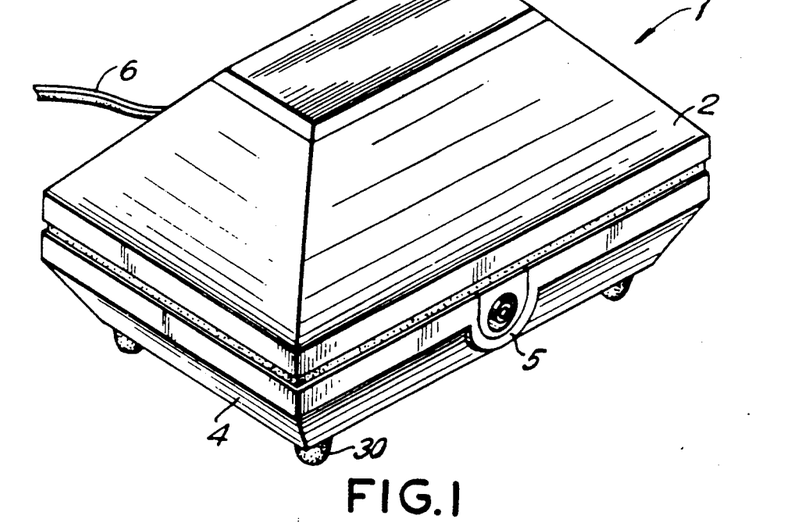
FIG. 1 is a perspective view of the air pump according to the invention, in an assembled position.

Referring now to the drawings in detail, FIG. 1 shows an air pump designated at reference numeral 1, the housing of which is comprised of a top housing 2 and a bottom housing 4 which close the pump and are connected to each other by any suitable fasteners, such as screws. A part of an electric cord 6 normally terminated with a plug (not shown) to connect the pump to a source of electrical current is also shown in FIG. 1. FIG. 1 further illustrates an air outlet 5.

Figure 2:
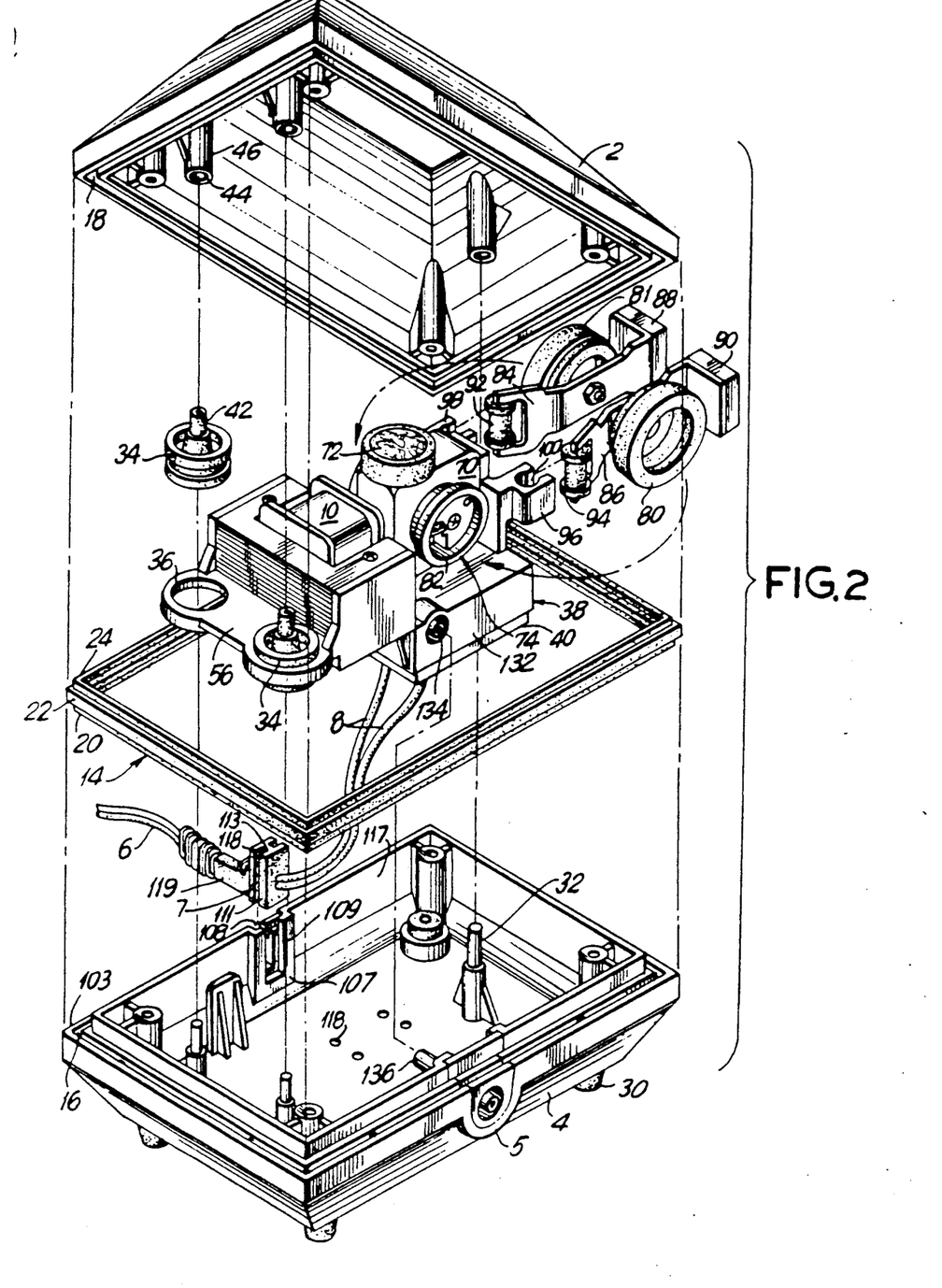
FIG. 2 is an exploded perspective view of the air pump with internal parts of the pump exposed.
Figure 3:
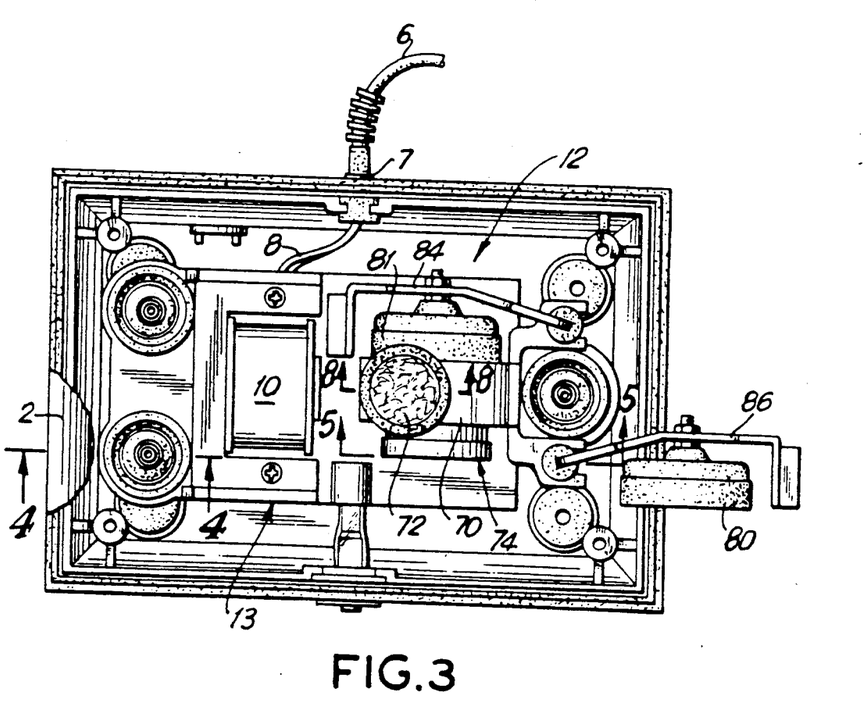
FIG. 3 is a top plan view of the pump with its top housing removed.

As best seen in FIGS. 2 and 3, cord 6 is terminated with an insulating plug 7 penetrating the side wall of the bottom housing 4. Electric leads 8 lead to two contacts of a winding 10 of an electromagnet motor-operated pump unit 12, the motor of which also includes an A.C. electromagnet 13. A waterproof seal or gasket 14 of a substantially rectangular shape, preferably of rubber, is provided between the upper housing 2 and bottom housing 4. A portion 20 of the peripheral seal or gasket 14 is fittingly inserted in a substantially vertical groove 16 formed along the peripheral edge of the bottom housing 4. Gasket 14 further includes a middle portion 22 and a further end portion 24 which in assembly is closely fitted in a correspondingly vertical groove 18 provided in the top housing 2 along its peripheral edge. The middle portion 22 of the gasket projects horizontally outwardly relative to confronting portions 20 and 24 of the gasket 14 so that in the closed position of the pump housing the middle portion 22 extends along two peripheral edges of the housing portions 2 and 4 (FIG. 1) closely adjacent to those edges so as to provide a reliable waterproof connection between the top housing 2 and the bottom housing 4. Four feet formed as shock absorbing supports 30, also shown in FIG. 6, preferably of rubber, are provided on the underside of the bottom housing 4.

The bottom housing 4 has on the internal surface thereof three mounting posts 32 formed preferably integral with the bottom housing made of plastic, for example, by injection molding. The mounting posts 32 receive cushioning rubber cups 34 fitted in openings 36 formed in three locations of a support plate 56 of a casing 38 of the pump unit. In addition, vibration dampening strips, preferably of rubber, (not shown) are attached to the underside 40 of the casing 38 of the pump unit. Due to the provision of mounting posts 32 and cushioning rubber cups 34 the pump unit is placed within the bottom housing of the pump in a suspended but sufficiently stable position, and in operation pump vibrations are substantially absorbed.

Figure 4:
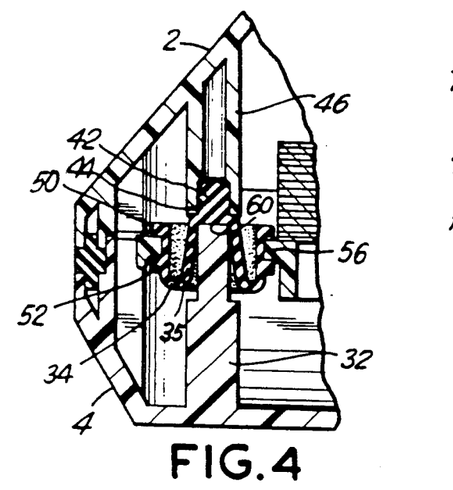
FIG. 4 is a cross-sectional view taken along line 4—4 of FIG. 3.

As best seen in FIG. 4 each mounting post 32 is an elongated element. Each vibration absorbing cup 34 has an inverted cup-shaped portion 35 and an upwardly extending central stub projection 42 (also shown in FIG. 2) which is received in a mating hole 44 formed in each of three respective posts 46 depending from the inner surface of the top housing 2. Each cushioning cup 34 further includes two vertically spaced beads or flanges 50 and 52 projecting radially outwardly from the cup-shaped portion 35 so that both flanges 50, 52 of the cup inserted into the respective opening 36 of pump unit casing 38 snugly embrace the platform 56 of the pump unit casing 38. A lower surface 60 of the central stub or projection 42, also forming the bottom of the cup-shaped portion 35 of each cushioning cup 34, is situated on the upper end face of the mounting post 32 in each instance.

It is to be noted that the pump unit 12 in the illustrated embodiment is held in the bottom housing 4 by the rubber cups 34 on three mounting posts 32 also spaced from the side walls of the bottom housing 4 so that pump vibrations are absorbed not only in a vertical direction but also in transversal directions.

Figure 3A:
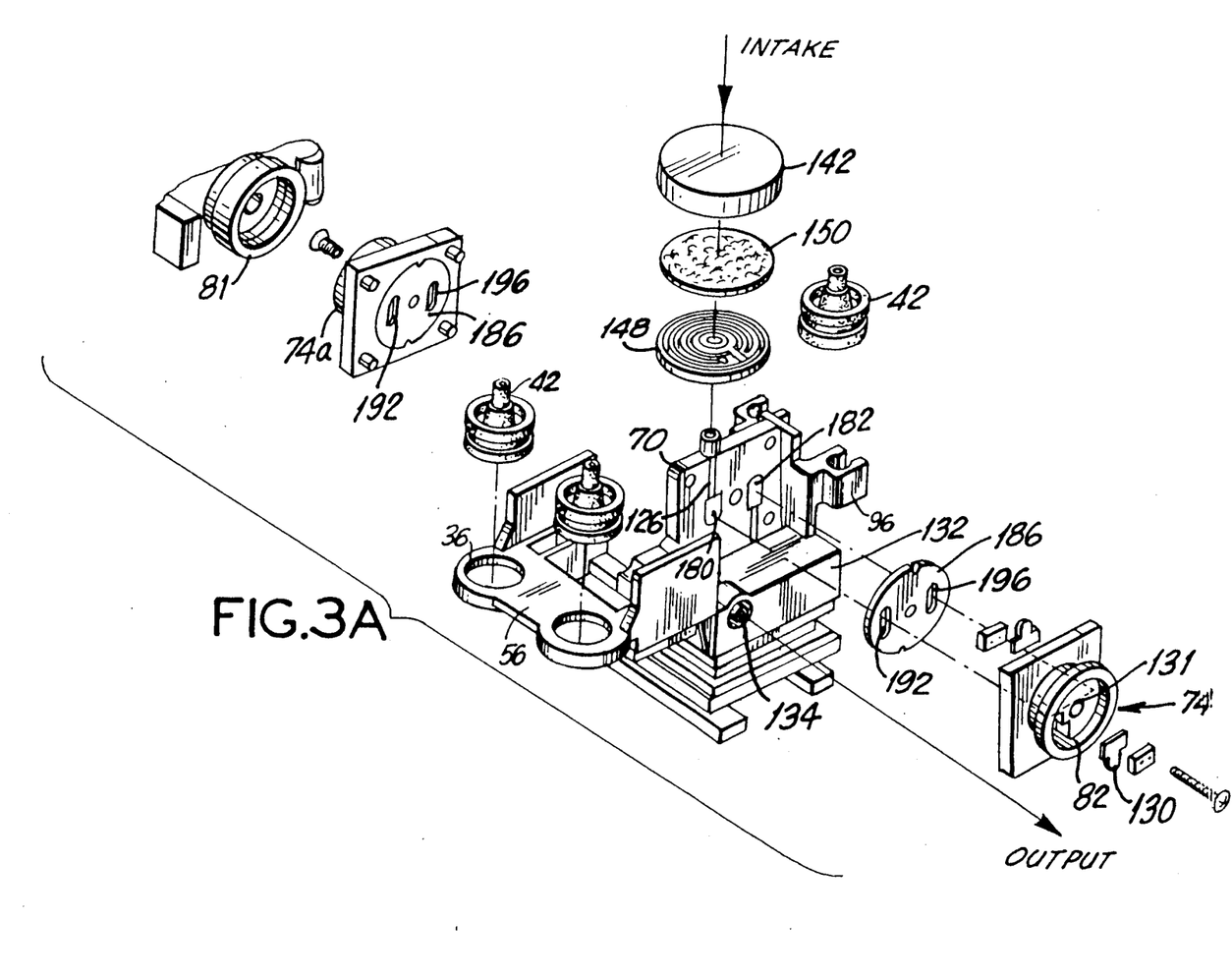
FIG. 3A is a diagrammatic exploded perspective view of the pump unit with the motor and pump arms removed.

With reference to FIGS. 2, 3 and 3A, it will be seen that the pump unit of the electromagnetic air pump according to the invention includes a central member 70 provided with an air inlet assembly 72, two valve closure members 74, 74a each provided at the side of the pump chamber 70, a motor with the electro-magnet 13 having the winding 10, and a pair of pump diaphragms 80, 81 each of which is mounted over the respective one of the valve closure members 74, 74a to form therewith two pump chambers 82 (only one pump chamber is shown in FIG. 2). A pair of vibrator arms 84, 86 each provided with a magnet 88, 90 at the end thereof and pivotally supported at pivots 92, 94, respectively, in snap-fit holders 96, 98 formed as extensions of the casing 38 of the pump unit, are each secured to the center of the respective pump diaphragms 80, 81 at their middle.

Figure 5:
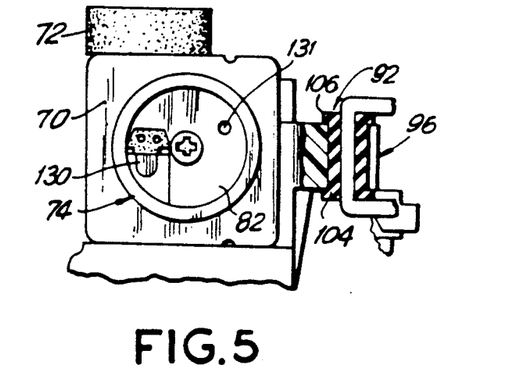
FIG. 5 is a partial side view of the pump unit with the diaphragm pump member removed.

As best seen in FIG. 2, each holder 96, 98 is formed with a substantially circular recess 100, into which the pivot 92, 94, formed as a cylindrical body having a through hole and made, for example, of rubber, is inserted. The end of each arm 84, 86 which is opposite to that carrying the permanent magnet 88, 90, is formed as a U-shaped portion with two projections extending towards each other and inserted into the through hole of pivot 92,94 to hold the latter. Each holder 96, 98 is also of U-shaped cross-section. The circular recess 100 of each holder merges into a narrower rectangular neck 102 which is open at the external end of the holder. Since each pivot 92,94 is made of resilient material it can be easily snap-fit into and detached from the recess of the holder 96, 98 so that arms 84, 86 with the pump diaphragms 80, 81 attached thereto can be interchanged when worn out. End flanges 104, 106 of each pivot 92, 94 abut against the opposite surfaces of the respective holder when the pivot of each vibrator arm 84, 86 is clamped in the recess 100 of the holder, as shown in FIG. 5. Further, pivots 92, 94 of resilient material also contribute to cushioning effect of the pump unit.

As also shown in FIGS. 2 and 3 the bottom housing 4 has in its side wall 103 a U-shaped groove 108. The bottom housing also has an inner substantially vertical peripheral rim 117 formed at its internal side with a lug 107 also having a U-shaped groove 109. Groove 108 receives a tailing portion 119 of the plug the head of which is of substantially rectangular cross-section and includes two flanges 111 spaced from each other and interconnected by a narrow neck 113 to form a groove 115 of substantially rectangular cross-section at each side of plug 7. Upon the insertion of the plug 7 into grooves 108, 109 from above the neck 113 is received in groove 109 whereas flanges 111 of the plug snugly abut against the opposing walls of the lug 107 thus ensuring that plug 7 is snugly fit in groove 109. Plug 7 can be pulled out of grooves 108,109 and removed from the bottom housing 4. Due to the snug fit of the plug 7 in the bottom housing the plug seals the internal wires and relieves strain of the cord extending further inward of housing 2, 4.

Figure 6:
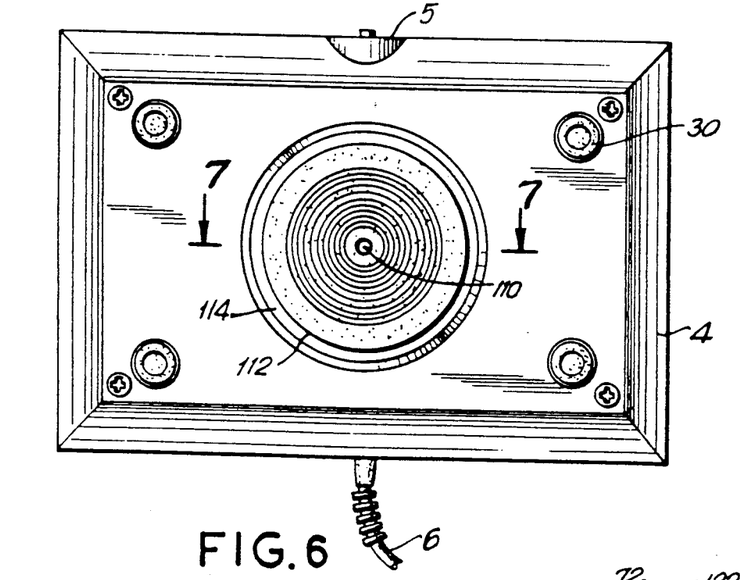
FIG. 6 is a plan underside view of the air pump of FIG. 1.
Figure 7:
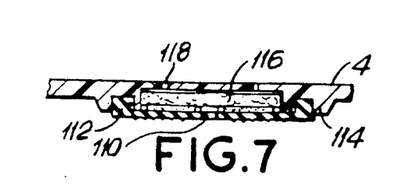
FIG. 7 is a sectional view taken along line 7—7 of FIG. 6.

As best seen in FIGS. 6 and 7 an air inlet hole is provided in a removable retainer 112, made for example, of rubber and clamped in a groove 114 formed in an underside of the bottom housing 4. Retainer 112 holds a felt washer 116 through which air flows via holes 11 into the interior of the pump. Air entering inlet hole 110 winds up through holes 118 thus smoothing the flow of air into the pump. Two of, for example, four holes 118 are shown in FIG. 7. The felt washer 116 and felt retainer 112 of rubber further absorb pump vibrations. The interior of the air pump housing has capacity of a relatively large air tank. It cuts air vibrations when air flows through the interior of the housing 2, 4 to the air inlet assembly 72 attached to the central member 70.

Figure 8:
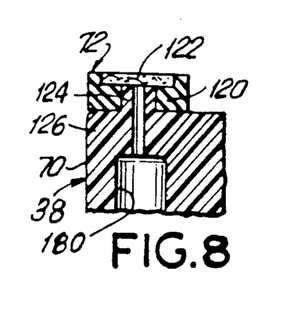
FIG. 8 is a partial sectional view taken along line 8—8 of FIG. 3 and showing an air inlet assembly of the pump unit.

As best seen in FIG. 8 air inlet assembly 72 includes a felt retainer 120 holding a felt washer 122 and plugged onto a boss 124 formed with a hole 126 which opens into an air suction chamber 180 formed in the central member 70 of pump unit casing 38.

Figure 9:
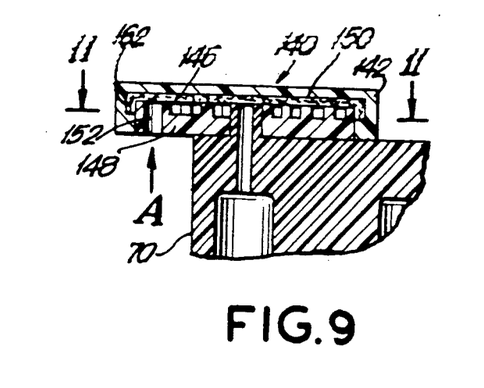
FIG. 9 is a view similar to that of FIG. 8 but illustrating a further embodiment of the air inlet assembly of the pump unit.
Figure 10:
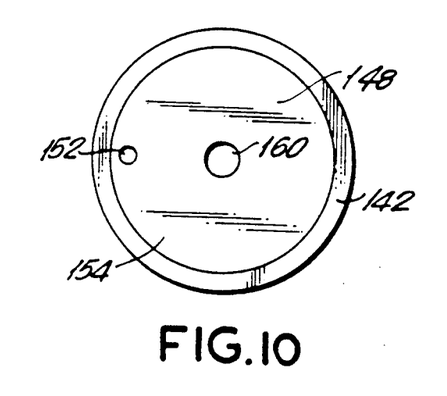
FIG. 10 is a plan view of the acoustic absorber as seen from arrow A of FIG. 9.
Figure 11:
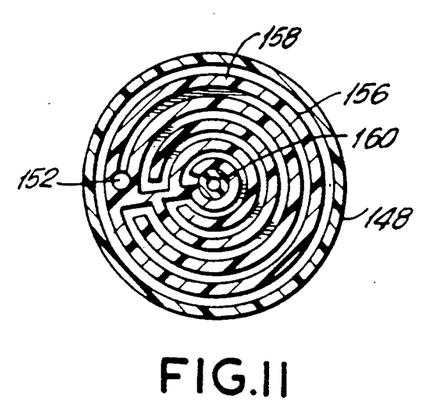
FIG. 11 is a sectional view taken along line 11—11 of FIG. 9.

FIGS. 9 to 11 illustrate a further embodiment of the air inlet assembly provided on the casing 38 of the pump unit and designated at 140. Air inlet assembly 140 is plugged onto the boss 124 provided on the top surface of the central member of casing 38. Air inlet assembly 140 includes a cup-shaped enclosure member 142 having an inwardly projecting rim 144 at the end thereof facing the central member 70 of pump unit casing 38. Enclosure member 142 is formed of any suitable noise attenuating or absorbent material, for example, rubber, and has a closed bottom wall 146 which prevents any air leakage from the hole 126 forming the air inlet into the air suction chamber 180 formed in the central member 70 as will be explained below. A substantially disc-shaped air-admitting member 148 also of noise absorbent material, such as rubber or the like, is tightly inserted in the enclosure member 142 with a flat metallic washer 150 interposed therebetween. An air admitting opening 152 which extends through the member 148 opens at an underside 154 of member 148 into the interior of the pump housing 2, 4 whereby air sucked through holes 118 in the bottom wall of the pump housing 2, 4 flows into opening 152 of the air-admitting member 148. As best seen in FIG. 11, a substantially multi-coil or weaving continuous air passage 156 formed between circular concentrical partitions 158 provided in the air-admitting member 148, for example, by injection molding, is provided to connect the opening 152 with a central hole 160 which is in communication with hole 126 leading into the air suction chamber 180 of central member 70. Air which enters the air-admitting member 148 via opening 152 smoothly circulates in the weaving passage 156 before it flows into the air suction chamber 180 through holes 160 and 126, which results in significant noise absorption. Flat, stiff metallic washer 150 reliably seals off the air passage 156 and secures the same against any air leakage. Due to the provision of the air-admitting member 148 with the continuous air passage the entire air inlet assembly operates as an acoustic absorber or noise filter which substantially smooths the pump operation. Inwardly radially extending rim 144 engages with an outwardly radially protruding rim 162 of the air-admitting member 148 to tightly hold the disc-shaped member 148 in the enclosure member 142.

Referring back to FIG. 5 it will be seen that each closure member 74, 76, of which closure member 74 is illustrated in FIG. 5, has one flap valve 130 on the side of the closure member that is seen in the drawing and another flap valve (not seen) provided on the internal side of the wall of closure member 74 and cooperating with a hole 131 to close and open the same. Both flap valves 130 are energized during the pumping action of the pump diaphragms to allow air which fills the air suction chamber 180 of the central member 70 of the pump unit to be pumped into the pump chamber formed by the closure member 74 (74a) and the diaphragm 80 (81). Below the central member 70, is provided in the pump unit casing 38, a lower air chamber 132 seen in FIG. 2 and FIG. 3A. Air that enters the air suction chamber 180 through the air nozzle 126 is pumped into the lower chamber 132 connected to an air discharge chamber 182 in the central member 70 so that some air is therefore always stored in chamber 132. The provision of the additional air storing chamber 132 in the pump unit ensures a more uniform and smooth flow of air through the pump unit to further ensure a noiseless operation of the pump. An air outlet opening 134 leading via a pipe 136 to the outlet 5 in the bottom housing is formed in the lower chamber 132.

Air sucked through inlet nozzle 126 into the air suction chamber 180 of the central member 70 is pumped through two side pump chambers formed by the pump diaphragms or vibrators 80,81 as will be described in detail below. If one of the diaphragms is worn out the pump still works although at ½ capacity. If flap valve 130 on the side of the damaged diaphragm does not work, air from another side does not escape.

Two chambers, namely the air suction chamber 180 and the air discharge chamber 182 are formed in central member 70 which are enclosed at two opposite sides of the central member 70 with enclosure members 74, 74a and sealed at opposite end faces of member 70 by respective washers 186 (FIG. 3A). Chambers 180 and 182 are formed by through windows or openings transversely extending through the central member 70.

In operation, when alternate electric current is applied to electromagnet 13 of the electromagnet motor to energize it, the alternation of the magnetic field causes the vibrator arms 84 and 86 to vibrate symmetrically so that magnets 88 and 90 alternatively confront each other or diverge from one another. It is to be noted that symmetrical vibration of the magnets 88 and 90 towards and away from each other produces less noise than parallel vibration. Vibrator arms 84, 85 vibrate about respective supporting points to operate the pump diaphragms 80, 81 for compressing air received in the pump chambers as disclosed in U.S. Pat. No. 4,154,559, the appropriate part of the disclosure of which is incorporated herein by reference. As further seen in FIG. 3A, port 126 receiving air from the inlet assembly 72 or 140 shown in FIG. 8 or FIG. 9, respectively, and illustrated in FIG. 3A in dotted lines, opens into the air suction chamber 180 which is in communication via openings 192 provided in the two sealing washers 186, mounted in the two closure members 74, 74a, respectively, with the two pump chambers 82. Air compressed in the pump chambers 82 by pulsating of the pump diaphragms 80, 81 when the latter are energized by the motor 13, is further pumped via openings 196, also formed in the sealing washers 194, into the air discharge chamber 182 of the central member 70, and from there, via a port 200 connecting the discharge chamber 182 with the interior of the lower air storing chamber 132, into the latter. Air is then discharged from the air storing chamber 132 through its outlet opening 134 and towards the outlet 5 in the bottom housing. The air path is shown in FIG. 3A by arrows.

Thus, when the pump diaphragms are pulsated, air sucked from the atmosphere through holes 118 into the pump is carried into air inlet assembly 72 or 140 and is then conveyed through the two chambers 180, 182 by the action pump of the diaphragms to the outlet hole 134 to pump air through a suitable tube into the aquarium tank. The above patent discloses the operation of the electromagnetic pump with two inwardly positioned diaphragm pump members arranged similarly to the embodiment of the present invention.

A two pump unit with two reciprocating pump units can be enclosed in a single housing. The two pump units in such an embodiment are suspended on the mounting posts formed on the bottom housing similarly to the single pump unit. The two pump units may have their electromagnet motors positioned on a common support. The permanent magnets of two vibrator arms of each pump unit face toward each other while the pivots of the vibrator arms are inserted in the respective holders formed at the outer sides of the pump units. The bottom housing of the double unit pump has two outlets to which tubes leading to different locations in the aquarium tanks are connected.

There has been disclosed heretofore the best embodiment of the invention presently contemplated. However, it is to be understood that various changes and modifications may be made thereto without departing from the spirit of the invention.

What is claimed is:

1. Air pump for aquarium aeration, comprising housing means including bottom housing means and top housing means;
    at least one electromagnetic pump unit supported in said bottom housing means and including a casing including a central member, said casing being provided with air inlet means and air outlet means;
    said central member having an air suction chamber receiving air from said air inlet means and an air discharge chamber;
    said pump unit including two vibrators positioned at two sides of said central member, respectively, and each of said two vibrators including a diaphragm pump member;
    said central member including at each side thereof a valve closure member provided with valve means to communicate with said air suction chamber, the valve closure member at each side of said central member being closed at an external side thereof with a respective diaphragm pump member to form therewith a pump chamber at each respective side of said central member;
    said vibrators including magnets;
    electromagnetic motor means to energize said magnets of said vibrators upon application to said motor means of a source of energy so as to reciprocally move said vibrators and thereby pulsate said diaphragm pump cause a said air sucked into said air suction chamber of said central member to be pumped to said air discharge chamber of said central member; and air storing means defined in said casing and communicating with said air discharge chamber so that air pumped to said air discharge chamber flows to said air storing means, said air storing means being provided with said outlet means to allow air to flow from said air storing means to said outlet means;

said air storing means storing some air to enable a more uniform air flow from said air inlet means to said outlet means to thereby dampen pump vibrations.

2. An air pump as defined in claim 1, wherein said vibrators are elongated arms pivotally supported on said central member and being removably connectable thereto to enable interchanging of said arms.

3. An air pump as defined in claim 1, and further comprising:

means to support said pump unit in said housing means so as to substantially reduce vibration of said pump unit during operation, said bottom housing means including a plurality of mounting posts extending upwardly from a bottom wall of said bottom housing means, and wherein said support means includes a plurality of anti-vibration cushioning cups connected to said casing and mounted on said mounting posts to enable said pump unit to float in said housing means.

4. An air pump as in claim 1, and further comprising:

means for sealing said bottom housing means to said top housing means when they are connected to each other, and wherein said sealing means includes a peripheral seal extending along a periphery of each of said bottom means and said top means.

5. Air pump as defined in claim 2, wherein said casing is formed, at a side thereof facing away from said motor means, with two holders receiving said arms.

6. Air pump as defined in claim 2, wherein said arms are each provided with a pivot member received in a respective one of said holders.

7. Air pump as defined in claim 6, wherein each holder includes a recess, each pivot member being fittingly received in said recess and being removable therefrom.

8. Air pump as defined in claim 7, wherein each arm has an end portion inserted into said pivot member and pivotable relative thereto between an operative position in which said diaphragm member encloses said closure member and a non-operative position in which said arm is pivoted away from said closure member and may be interchanged.

9. Air as defined in claim 7, wherein said pivot member is formed of vibration-cushioning material.

10. Air pump as defined in claim 7, wherein said recess is of substantially circular shape with a narrower neck portion open outwardly to permit the removal of each arm.

11. Air pump as defined in claim 3, wherein said casing includes a support platform provided with holes, said cushioning cups each being inserted into a respective one of said holes and including a cup-shaped portion situated on the respective mounting post, and two flanges outwardly radially extending from said cup-shaped portion and each snugly abutting against a surface of the support platform of said casing.

12. Air pump as defined in claim 3, wherein each of said cushioning cups includes an inverted cup-shaped portion situated on the respective mounting post, and a cylindrical elongated projection extending upwardly of said inverted cup-shaped portion, said top housing means including a plurality of post-like members each provided with a recess which receives said elongated projection when said top housing means are connected to said bottom housing means.

13. Air pump as defined in claim 3, wherein each cushioning cup is made of rubber.

14. Air pump as defined in claim 1, wherein said air storing means includes an additional air chamber defined in said casing.

15. Air pump as defined in claim 14, wherein said additional chamber is positioned below said central member.

16. A pump as defined in claim 4, wherein said peripheral seal is a strip having two outer portions insertable into said bottom housing means and said top housing means, respectively, and a middle portion extending snugly adjacent confronting edges of said bottom housing portion and said top housing portion when they are connected to each other.

17. Air pump as defined in claim 16, wherein said bottom housing means and said top housing means each includes at an open end thereof a groove receiving one of said outer portions of said strip.

18. Air pump as defined in claim 16, wherein said strip is made of rubber.

19. Air pump as defined in claim 1, wherein said central member has an upper wall formed with said air inlet means, said air inlet means being formed as a nozzle having a hole which opens into and tapers towards said air suction chamber.

20. Air pump as defined in claim 1, wherein said bottom housing means includes external air inlet means through which air enters said housing means from the atmosphere to flow to said air inlet means of said casing, said external air inlet means including a felt retainer having a hole, a felt washer positioned in said retainer, and a plurality of holes formed in a bottom wall of said bottom housing means, said holes allowing air to flow through said felt washer into said housing means.

21. Air pump as defined in claim 1, wherein said air inlet means of said casing includes acoustic absorber means attached to said central member.

22. Air pump as defined in claim 21, wherein said acoustic absorber means includes means defining an inlet opening admitting air into said absorber means, means defining an outlet opening connected to said central chamber, and means defining a continual weaving passage interconnected between said inlet opening and said outlet opening and formed of a noise absorbent material so that air admitted through said inlet opening circulates in said continual passage before it enters said outlet opening.

23. Air pump as defined in claim 22, wherein said acoustic absorber means further includes an enclosure member accommodating said means defining a continual weaving passage and formed of a noise absorbent material.

24. Air pump as defined in claim 23, wherein said enclosure member is cup-shaped.

25. Air pump as defined in claim 24, wherein said enclosure member is constructed so as to prevent leakage of air from said means defining a continual weaving passage.

26. Air pump as defined in claim 23, further including a disc-shaped member including said means defining a continual weaving passage.

27. Air pump as defined in claim 26, wherein said disc-shaped member is formed with a continual multi-coil channel which constitutes said passage.

28. Air pump as defined in claim 27, wherein said acoustic absorber means further includes a stiff washer inserted between said disc-shaped member and said enclosure member and accommodated therein.

29. Air pump as defined in claim 28, wherein said washer is of metal.

30. Air pump as defined in claim 28, wherein said enclosure member is cup-shaped and has a bottom wall, said washer being inserted between said bottom wall and said disc-shaped member.

31. Air pump as defined in claim 30, wherein said enclosure member has a radially inwardly projecting rim and said disc-shaped member has a radially outwardly projecting rim interengaging with said inwardly projecting rim to hold said disc-shaped member in said enclosure member so as to prevent air leakage therefrom.

32. Air pump as defined in claim 12, wherein said vibrators are terminated with magnets and are adapted to reciprocally move so that said magnets alternately confront each other or diverge from one another.

* * * * *